(12) United States Patent
Huang

(10) Patent No.: US 8,205,115 B2
(45) Date of Patent: Jun. 19, 2012

(54) SYSTEM AND METHOD FOR TESTING A COMPUTER

(75) Inventor: Yong-Zhao Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 113 days.

(21) Appl. No.: 12/762,379

(22) Filed: Apr. 19, 2010

(65) Prior Publication Data

US 2011/0055634 A1    Mar. 3, 2011

(30) Foreign Application Priority Data

Aug. 27, 2009    (CN) .......................... 2009 1 0306158

(51) Int. Cl.
*G06F 11/00* (2006.01)

(52) U.S. Cl. ........................................................ 714/25

(58) Field of Classification Search .............. 714/25–32, 714/36, 37, 38.3, 46, 47.1, 47.2, 48
See application file for complete search history.

(56) References Cited

U.S. PATENT DOCUMENTS

| | | | | |
|---|---|---|---|---|
| 6,029,257 | A * | 2/2000 | Palmer | 714/40 |
| 6,175,774 | B1 * | 1/2001 | Frank et al. | 700/79 |
| 6,581,169 | B1 * | 6/2003 | Chen et al. | 714/47.1 |
| 6,766,458 | B1 * | 7/2004 | Harris et al. | 726/6 |
| 7,334,166 | B1 * | 2/2008 | Rhea et al. | 714/46 |
| 7,451,349 | B2 * | 11/2008 | Tsai et al. | 714/27 |
| 7,587,636 | B2 * | 9/2009 | Tillmann et al. | 714/33 |
| 7,757,124 | B1 * | 7/2010 | Singh et al. | 714/32 |
| 7,865,779 | B2 * | 1/2011 | Tsang | 714/38.1 |
| 7,921,335 | B2 * | 4/2011 | Kiefer et al. | 714/46 |

* cited by examiner

*Primary Examiner* — Nadeem Iqbal

(74) *Attorney, Agent, or Firm* — Altis Law Group, Inc.

(57) ABSTRACT

A system and method for testing a computer divide test programs in a test file into hardware test programs and software test programs. A test server selects one or more test programs from the divided test file according to test parameters of the computer. The test server generates a test command for testing test items of the computer. The computer executes the test command. The test server analyzes test results and stores analyzed results into a predefined storage path.

12 Claims, 3 Drawing Sheets

SYSTEM AND METHOD FOR TESTING A COMPUTER

BACKGROUND

1. Technical Field

Embodiments of the present disclosure relate to test technology, and more particularly to a system and a method for testing a computer.

2. Description of Related Art

Computer systems need to be tested as they are manufactured. A program test file unique to a specific computer type is used to test the specific computer for various problems. Since the program test file is unique for each specific computer type, there are often many program test files that are needed. Manual operation of applying the specific kind of program test file for a specific computer type is done presently, making it very inconvenient and time consuming.

What is needed, therefore, is an improved system and method for testing a computer.

DETAILED DESCRIPTION

The processes described may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
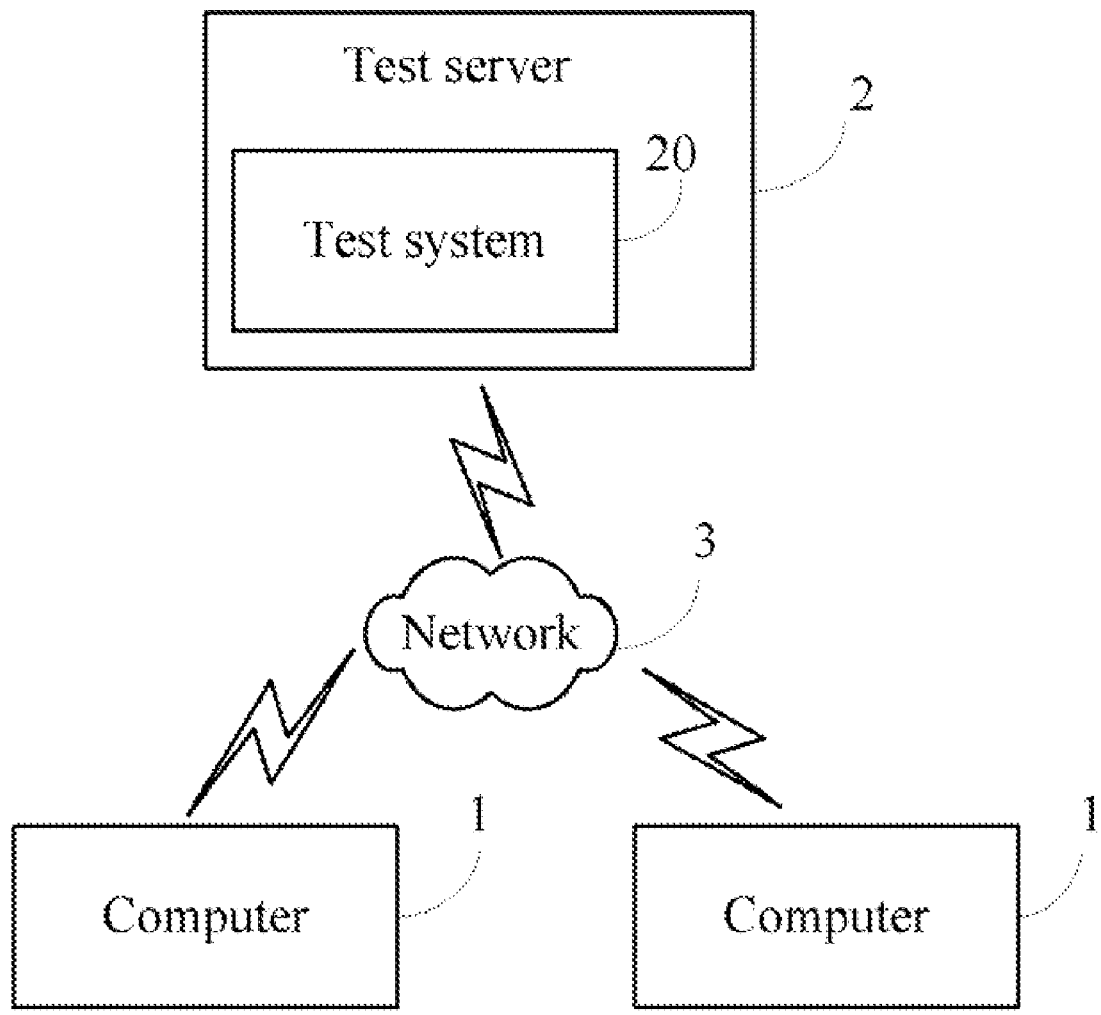
FIG. 1 is a block diagram of one embodiment of a test server comprising a test system.

FIG. 1 is a block diagram of one embodiment of a test server 2 comprising a test system 20. The test system 20 may be used to test computers 1 (only two shown) connected to the test server 2 via a network 3. In one embodiment, the network 3 may be the Internet, intranet, or other kinds of communication networks. The computers 1 may include notebook computers and desktop computers, for example.

Figure 2:
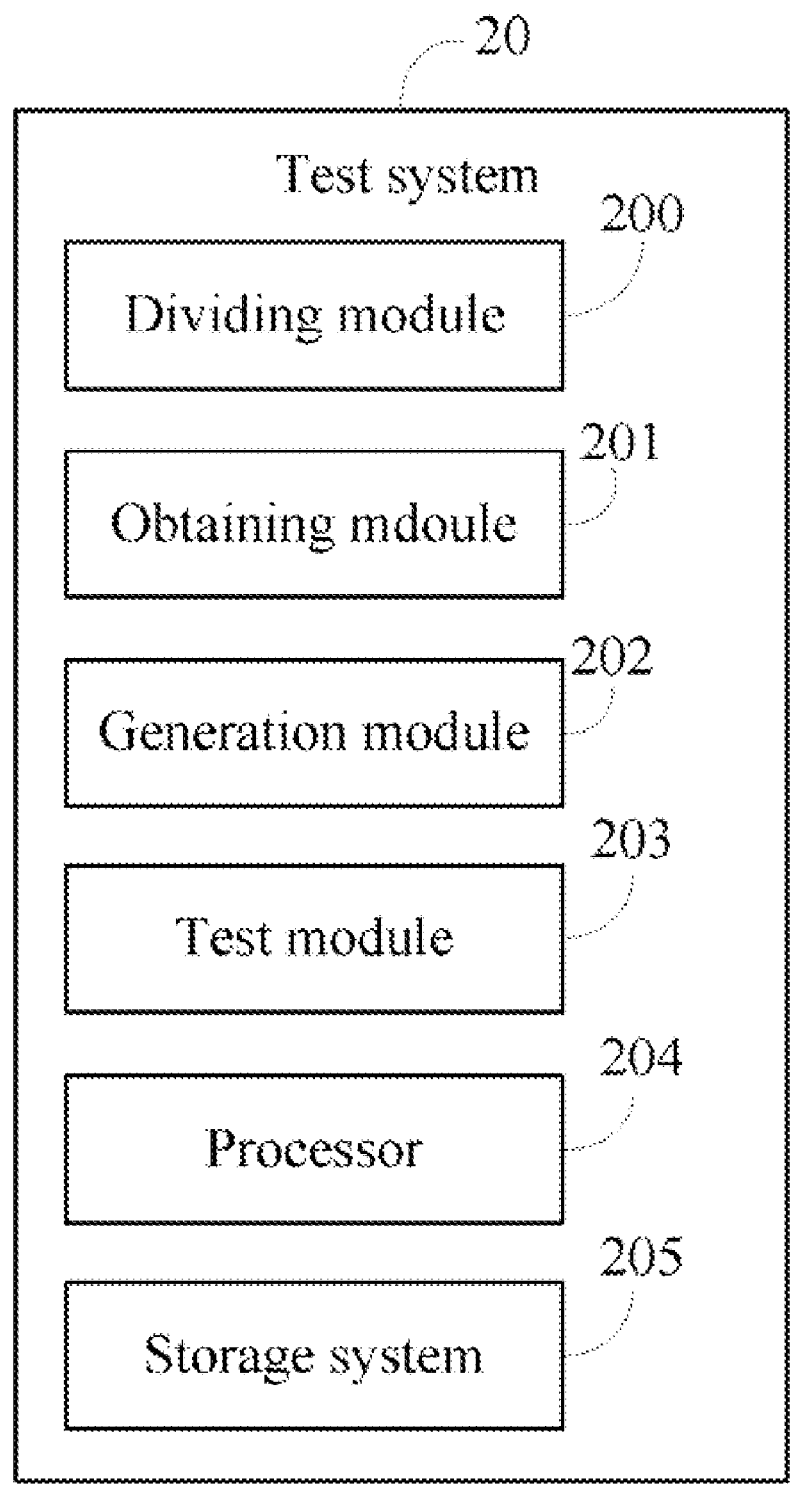
FIG. 2 is a block diagram showing functional modules of the test system of FIG. 1.

FIG. 2 is a block diagram of functional modules of the test system 20 in FIG. 1. In one embodiment, the test system 20 may include a dividing module 200, an obtaining module 201, a generation module 202, and a test module 203. The test system 20 further includes a processor 204 and a storage system 205. It may be understood that one or more specialized or general purpose processors, such as the processor 204, may be used to execute one or more computerized codes of the function modules 200-204. The one or more computerized codes of the functional modules 200-204 may be stored in the storage system 205.

The storage system 205 also stores a test file corresponding to each computer 1. Each test file includes a plurality of test programs. In one embodiment, the test programs may include hardware test programs and software test programs. For example, a first test program may be used to test all types of memories (e.g., random access memory) of a computer A, and a second test program may be used to test all types of hard disks (e.g., a hard disk drive) of the computer A.

The dividing module 200 divides the plurality of test programs of a test file of one of the computers 1 to be currently tested into hardware test programs and software test programs. The hardware test programs include a hardware test program of each hardware item to be tested, such as a memory, a hard disk, and a power supply, for example. The software test programs include a software test program of each software item to be tested, such as an operating system.

The obtaining module 201 obtains test parameters from the current computer 1. The test parameters may include, but are not limited to, a type of the current computer 1, configurations of the current computer 1, test items, a standard performance range of each test item, and a predefined storage path for storing test results. The obtaining module 201 also selects one or more test programs from the divided test programs in the test file according to the test parameters. For example, if the test items may include an Intel P3 CPU test, the obtaining module 201 selects the test program for Intel P3 CPU from the hardware test programs.

The generation module 202 generates a test command for testing the current computer 1 according to the selected test programs and the test parameters. In one embodiment, the test command may include, but not be limited to, the test items, a test program corresponding to each test item, a test time to test each test item, the standard performance range of each test item, and the predefined storage path.

The test module 203 controls the computer 1 to execute the test command. After execution of the test command by the current computer 1, the test module 203 obtains test results from the current computer 1. The test module 203 analyzes the test results to determine if the test results are within the standard performance range of each test item. The test module 203 stores analyzed results into the predefined storage path of the current computer 1. In one embodiment, if the test result of each test item is within the standard performance range of the test item, the test module 203 may determine that the test item is tested normally. If the test result of each test item is not within the standard performance range of the test item, the test module 203 may determine that the test item is tested abnormally.

Figure 3:
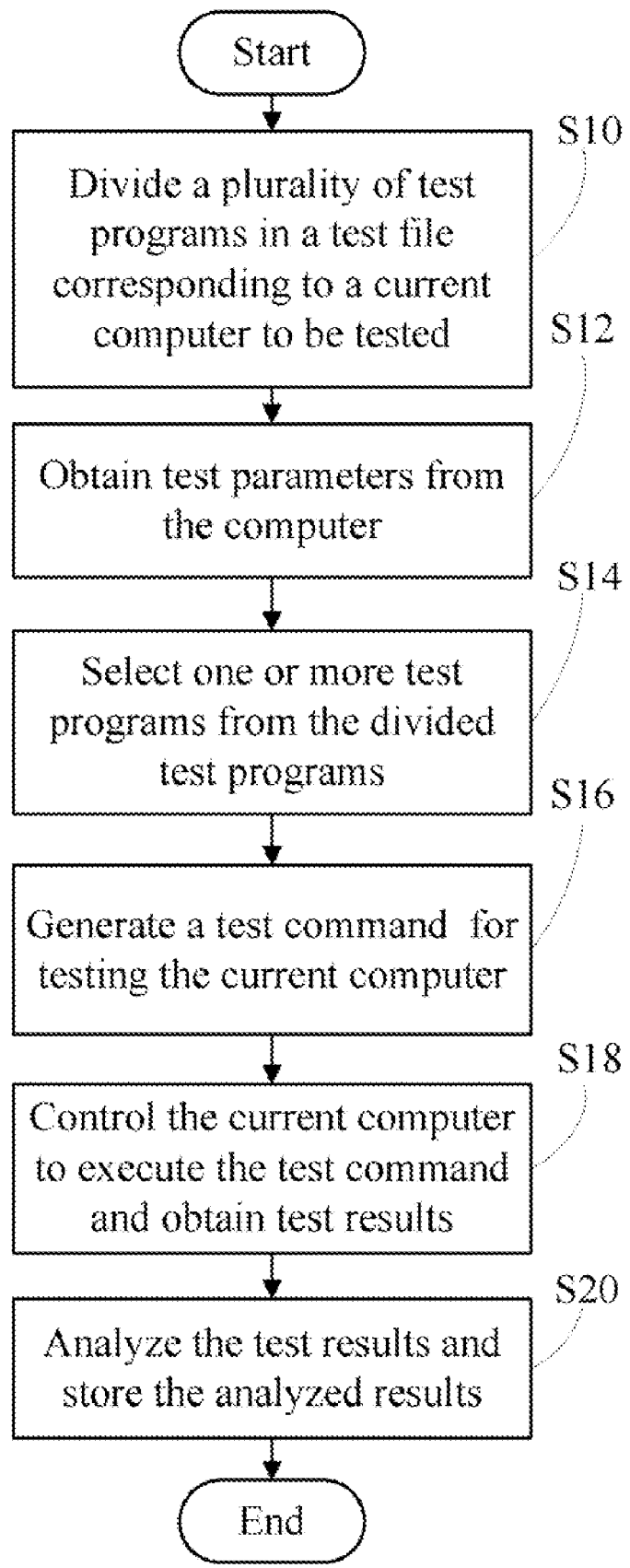
FIG. 3 is a flowchart of one embodiment of a method for testing a computer.

FIG. 3 is a flowchart of one embodiment of a method for testing the computer 1. Depending on the embodiment, additional blocks may be added, others removed, and the ordering of the blocks may be changed.

In block S10, the dividing module 200 divides the plurality of test programs of a test file of a current computer 1 to be tested into hardware test programs and software test programs.

In block S12, the obtaining module 201 obtains test parameters from the current computer 1. The test parameters may include, but are not limited to, a type of the current computer 1, configurations of the current computer 1, test items, a standard performance range of each test item, and a predefined storage path for storing test results.

In block S14, the obtaining module 201 selects one or more test programs from the divided test programs in the test file according to the test parameters.

In block S16, the generation module 202 generates a test command for testing the current computer 1 according to the selected test programs and the test parameters.

In block S18, the test module 203 controls the current computer 1 to execute the test command After execution the test command by the current computer 1, the test module 203 obtains test results from the current computer 1.

In block S20, the test module 203 analyzes the test results and stores analyzed results into the predefined storage path.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for testing a computer, the system comprising:
a storage system that stores a test file comprising a plurality of test programs of the computer; and
at least one processor to execute one or more programs stored in the storage system, the one or more programs comprising:
a dividing module operable to divide the plurality of test programs of the test file into hardware test programs and software test programs;
an obtaining module operable to obtain test parameters from the computer and select one or more test programs from the divided test programs of the test file according to the test parameters, wherein the test parameters comprise a type of the computer and configurations of the computer;
a generation module operable to generate a test command for testing the computer according to the selected test programs and the test parameters; and
a test module operable to control the computer to execute the test command, obtain and analyze test results from the execution of the test command, and store the analyzed results in a predefined storage path of the computer.

2. The system of claim 1, wherein the test parameters further comprises test items, a standard performance range of each of the test items, and the predefined storage path.

3. The system of claim 2, wherein the test command comprises the test items, a test program corresponding to each test item, a test time to test each test item, the standard performance range of each test item, and the predefined storage path.

4. The system of claim 1, wherein the hardware test programs comprise a hardware test program of each hardware test item, and the software test programs comprise a software test program of each software test item.

5. A method for testing a computer, the method comprising:
dividing a plurality of test programs of test file stored in a storage system into hardware test programs and software test programs;
obtaining test parameters from the computer, and selecting one or more test programs from the divided test programs of the test file according to the test parameters, wherein the test parameters comprise a type of the computer and configurations of the computer;
generating a test command for testing the computer according to the selected test program and the test parameters;
controlling the computer to execute the test command;
obtaining and analyzing test results from the execution of the test command; and
storing the analyzed results in a predefined storage path of the computer.

6. The method of claim 5, wherein the test parameters further comprise: test items, a standard performance range of each of the test items, and the predefined storage path.

7. The method of claim 6, wherein the test command comprises the test items, a test program corresponding to each test item, a test time to test each test item, the standard performance range of each test item, and the predefined storage path.

8. The method of claim 5, wherein the hardware test programs comprise a hardware test program of each hardware test item, and the software test programs comprise a software test program of each software test item.

9. A medium having stored therein instructions that, when executed by a test server, causes the test server to perform a method for testing a computer comprising:
dividing a plurality of test programs of test file stored in a storage system into hardware test programs and software test programs;
obtaining test parameters from the computer, and selecting one or more test programs from the divided test programs of the test file according to the test parameters, wherein the test parameters comprise a type of the computer and configurations of the computer;
generating a test command for testing the computer according to the selected test program and the test parameters;
controlling the computer to execute the test command;
obtaining and analyzing test results from the execution of the test command; and
storing the analyzed results in a predefined storage path of the computer.

10. The medium of claim 9, wherein the test parameters further comprises: test items, a standard performance range of each of the test items, and the predefined storage path.

11. The medium of claim 10, wherein the test command comprises: the test items, a test program corresponding to each test item, a test time to test each test item, the standard performance range of each test item, and the predefined storage path.

12. The medium of claim 9, wherein the hardware test programs comprise a hardware test program of each hardware test item, and the software test programs comprise a software test program of each software test item.

* * * * *